United States Patent
Ho

[11] Patent Number: 5,901,927
[45] Date of Patent: May 11, 1999

[54] GROUND STRIKE PROTECTION FUNCTION FOR AIRCRAFT AUTOPILOT

[75] Inventor: John Koon-Hung Ho, Scottsdale, Ariz.

[73] Assignee: Honeywell Inc., Minneapolis, Minn.

[21] Appl. No.: 08/683,492

[22] Filed: Jul. 18, 1996

[51] Int. Cl.⁶ .................................................. B64C 13/18
[52] U.S. Cl. .............................. 244/183; 244/195; 701/9; 701/12; 340/963
[58] Field of Search .................................. 244/17.13, 197, 244/183, 194, 195, 186–188; 340/963, 971; 701/301, 302, 9, 12, 11, 4, 5, 6, 8

[56] References Cited

U.S. PATENT DOCUMENTS

| | | | |
|---|---|---|---|
| 3,945,590 | 3/1976 | Kennedy, Jr. et al. | 244/197 |
| 4,419,732 | 12/1983 | Lambregts et al. | 244/183 |
| 4,956,780 | 9/1990 | Sankrithi et al. | 244/183 |

*Primary Examiner*—Galen Barefoot
*Attorney, Agent, or Firm*—Charles J. Ungemach

[57] ABSTRACT

A method and apparatus for use with an aircraft autopilot to prevent an aircraft part from striking the ground during near ground maneuvers by employing a protection circuit between the outer loop and the inner loop of the control chain between the autopilot and the control surface, the prevention circuit producing an output signal when there is a possibility of ground strike which output signal operates to reduce the control surface command signal from the inner loop to the control surface and thus be rapidly responsive to aircraft attitude changes that could produce ground strike.

13 Claims, 3 Drawing Sheets

GROUND STRIKE PROTECTION FUNCTION FOR AIRCRAFT AUTOPILOT

BACKGROUND OF INVENTION

1. Field of the Invention

The present invention relates to a method and apparatus for the protection against aircraft parts striking the ground during near-ground maneuvers such as take-offs, landings and go-arounds.

2. Description of the Prior Art

When maneuvering near the ground, great damage to an aircraft may occur if one of its wing tips strikes the ground, or if its nose wheel or tail touches down prior to main gear touch down. Avoidance of these possibilities is therefore of great importance. Present day aircraft use autopilots to help guide the aircraft not only between destinations but also during ground approaches. The autopilot usually provides, among other things, command signals indicative of roll angle, roll rate, pitch attitude, pitch attitude rate and altitude which are used to position the control surfaces (elevators, ailerons etc.) in order to maintain the aircraft in a desired flight path. The autopilot signals may also be useful in determining if wing tips, nose wheels or tails are getting too close to the ground. More particularly, when the aircraft is low enough to strike the ground and the mechanical design of the aircraft is known, then the exact roll and pitch angles are known where an unwanted ground strike will occur. Since aileron control signals and elevator control signals are used to control the roll and pitch of the aircraft, these signals can be used along with altitude signals to prevent unwanted ground strikes.

For purposes of simplicity, the present invention will be described in connection with the prevention of "tail strike", but it will be understood that the methods and apparatus of the present invention may also be used to avoid nose wheel strike and wing tip strike.

The autopilot pitch elevator command, used to control the aircraft pitch is generated using a two stage process the first stage of which, the outer loop, generates the pitch command or pitch rate command signal from the autopilot as a function of path error or speed error and the second of which, the inner loop, generates the elevator command signals as a function of pitch error or pitch rate error to control the angle of the elevators and cause the aircraft to fly along the desired path or at a desired speed. Outer loops are generally the "command outputs" of the autopilot indicative of the error between actual and desired flight path or airspeed. These outputs, usually, are either rate commands or attitude commands. Inner loops are generally of two types, the first, a "rate inner loop" responds to angular rate command signals and will be described in connection with FIG. 2 and the second, an "attitude inner loop" responds to pitch attitude or pitch angle commands and will be described in connection with FIG. 3. In either event, the inner loop generates signals to position the elevators at an angle necessary to bring the aircraft to the desired pitch rate or the desired pitch angle. Under most conditions, these signals will operate the elevators of the aircraft to follow the desired path and will thus avoid any undesired ground strike. However, maneuvering an aircraft near ground during atmospheric disturbances could cause the aircraft to move off course and produce a situation where the tail could prematurely touch ground as shown in FIG. 1. In FIG. 1, an aircraft 10 desires to fly along an approach path 12 but its actual flight path 14 is seen to have dropped below the desired approach path 12 so that the autopilot calls for a nose up command to the elevators to bring it back on course. If the aircraft is too close to the ground, the nose up command can cause the aircraft to over-rotate with the result that the tail could strike the ground 16. To avoid this, some aircraft employ a "tail strike" protection circuit which determines from the aircraft geometry and altitude when the aircraft might encounter a tail strike and produces a signal which is subtracted from the elevator command signals from the inner loop to reduce the nose up command. One such system, the 4059001-902, produced by Honeywell has been utilized on various aircraft and may generally be seen in FIG. 2. In FIG. 2, the autopilot operates in the outer loop system 20 to produce, in this case, a pitch attitude rate command signal, $\dot{\theta}_{com}$, on a line 21 which is fed to the rate inner loop system, shown in dashed line box 22, which converts the signal into a form the elevator can use, i.e. a signal indicative of the number of degrees of elevator per degree of pitch rate command. More particularly, a first summing circuit 23, in rate inner loop box 22, receives the rate command signal on line 21 and also receives the aircraft's actual rate of change of pitch signal, $\dot{\theta}$, on a line 24 and subtracts them to produce an error signal on a line 25. The error signal on line 25 is presented to an integrating circuit 26 to remove any steady state errors and the corrected signal from integrator 26 is presented to a second summing circuit 27 which also receives the error signal on line 25. The resulting corrected error signal from summing circuit 27 is presented on a line 28 to a gain box 29 which modifies the signal to correspond to elevator command signal in terms of desired elevator position. The value K of gain box 29 is determined by the elevator effectiveness of the aircraft and is usually a function of dynamic pressure or airspeed. The system is designed such that at low speed, K has a higher value whereas at high speed, K has a lower value. A Honeywell tail strike protection circuit 30 which receives inputs on lines 31, 32, 33 and 34 indicative of pitch angle, pitch rate, altitude and tail strike limit respectively is programmed to compute a correction signal when a tail strike is possible. Pitch angle and pitch rate are usually determined by the inertial reference unit, altitude is usually from a radio altimeter and the tail strike limit is a function of the geometry of the aircraft. The tail strike protection circuitry produces a corrective elevator command signal on a line 35 whenever there is a danger of tail strike. The elevator command signal from gain circuit 29 on a line 36 and the tail strike protection signal on line 35 are presented to a third summing circuit 37 which operates to subtract the tail strike protection signal on line 35 from the elevator command signal on line 36 to produce a total elevator command signal on a line 38 which is presented to the elevator controls shown by box 39. Since the autopilot command signal is reduced by the tail strike protection signal, the elevator command will be less of a nose up signal or may even be a nose down signal to correct for the over rotation caused by being below the desired flight path. This provides the desired protection in nearly all cases but in some situations, such as where the aircraft is far off of its desired flight path, the outer loop command may be so large that the elevator command signal overpowers the tail strike protection signal and damage could still result.

Another Honeywell system, the 4068300-901, has also been used to solve the tail strike problem in a slightly different way as seen in FIG. 3. This system has a pitch attitude inner loop (rather than a rate inner loop used in FIG. 2) and so a signal indicative of pitch angle, $\theta_{com}$, is produced by the outer loop circuitry 50 on a line 52 to a pitch command limiter 54. Limiter 54 controls the magnitude of the pitch angle signal so that the outer loop's pitch attitude command cannot exceed the tail strike limit determined by the geometry of the aircraft. Normally this is a relatively small value in the neighborhood of about 10 degrees. This limited signal is then presented on a line 56 to a pitch rate command limiter 58 so that the change in pitch angle command cannot be too fast. More particularly, if the outer loop pitch angle command signal were allowed to change abruptly, causing a large and sudden elevator control change, it could cause discomfort to the passengers. Accordingly, any rapid change in pitch angle command is limited or smoothed so that it takes place less rapidly. The limited pitch angle command signal is presented on a line 60 to the attitude inner loop circuit shown as dashed line box 61. It will be seen that the attitude inner loop circuitry for a pitch angle control is slightly different than the rate inner loop circuitry for the pitch rate control described in connection with FIG. 2. More particularly, the signal on line 60 is presented to a first summing circuit 62 which compares the commanded pitch angle with the actual pitch attitude, θ, on a line 64 and any difference is a pitch angle error signal presented on a line 65 to a gain box 66 which operates to modify the pitch angle error signal so as to produce a pitch rate command signal on a line 67 to a second summing circuit 68. The value K of gain box 66 is usually determined by the designer for purposes of controlling how fast the pitch angle error should be removed. A larger K value can remove the error faster but it has a greater effect on the overall stability of the aircraft/autopilot system. The remaining part of the inner loop is the same as the inner loop circuit of FIG. 2. More particularly, the pitch rate command signal is compared with the actual pitch angle rate signal, $\dot{\theta}$, on a line 70 to produce a resultant pitch rate error signal on a line 72. The signal on line 72 is presented to an integrator 74 which operates to remove any steady state errors in the signal on line 72 and presents the corrected signal on a line 75 to a third summing circuit 76 which also receives the signal on line 72. The corrected rate error signal is presented on a line 78 to a gain box 80 which converts the rate error signal on line 78 to an elevator command signal as described in connection with FIG. 2.

This attitude inner loop system is very reliable since the tail strike angle cannot be exceeded but because the input to the inner loop is an attitude command signal rather than a rate command signal, the system cannot respond as rapidly as a rate inner loop system so that the path tracking performance is not as good. Also there may be situations, for example where a last minute change of plans occurs (e.g. a "go around" is suddenly called for), where a large command results and the system cannot rotate the aircraft fast enough to avoid ground impact.

BRIEF DESCRIPTION OF THE INVENTION

The present invention is reliable and responsive and can be used with either a pitch rate command or a pitch attitude command from the outer loop. More particularly, a novel tail strike prevention function which limits the pitch rate command, is placed in front of the rate inner loop so that it produces an elevator command signal for reliable and rapid response to prevent tail strike.

DETAILED DESCRIPTION OF THE PREFERRED EMBODIMENTS

Figure 4:
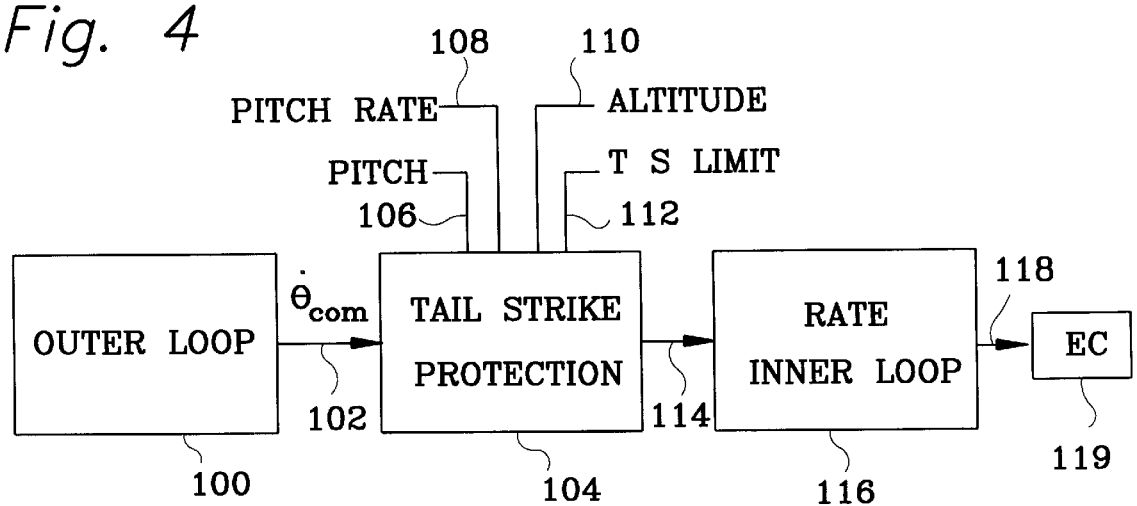
FIG. 4 is a block diagram showing the present invention used with a rate responsive system.

FIG. 4 shows an embodiment of the present invention for use in a system having a pitch rate inner loop. In FIG. 4, the outer loop 100 is shown producing a pitch rate command signal, $\dot{\theta}_{com}$, on a line 102 similar to FIG. 2. The signal on line 102 is not directly connected to the inner loop apparatus as was the case in FIG. 2, but rather is presented to a new tail strike protection device shown as box 104 to be discussed hereinafter. The tail strike protection apparatus 104 receives inputs on lines 106, 108, 110 and 112 indicative of pitch, pitch rate, altitude and tail strike limit respectively and includes a limiting function in which the magnitude of any signal from the outer loop 100 on line 102 is prevented from exceeding an upper limit defined by the equation:

$$UL=[K_1(\theta_{ref}-\theta-K_2\dot{\theta})]_{LL}^{HL} \qquad \text{(Equation 1)}$$

Where UL is the upper limit for box 104, $K_1$ is a constant which operates to convert angular changes (degrees) to angular rate (degrees per second) for use by the inner loop, $\theta_{ref}$ is the tail strike pitch limit which is determined by the aircraft altitude and the mechanical design of the aircraft, θ is the actual aircraft pitch angle or attitude, $K_2$ is a second constant which operates to convert angular rate (degrees per second) to angular changes (degrees) and $\dot{\theta}$ is the actual aircraft pitch rate. In equation 1, $K_2$ is designed so as to allow more nose down elevator command when the aircraft is pitching up, and allow more nose up elevator command when the aircraft is pitching down. $K_1$ is selected to determine the overall responsiveness of this tail strike protection function. The higher $K_1$ is, the more responsive is the tail strike protection function, but the system is usually less stable. The upper limit HL and the lower limit LL at the end of the equation are to show that the final value obtained is constrained to lie between a maximum value HL and a minimum value LL so that the signal does not get too large or too small. HL and LL are chosen such that the aircraft will have enough pitch maneuver capabilities but not large enough to cause passenger discomfort. For example, if the aircraft were far below the desired flight path with its nose pointing downwardly, the correction signal $[K_1(\theta_{ref}-\theta-K_2\dot{\theta})]$ might be very large and would cause the aircraft to generate a large pitch rate in the nose up direction and sustain it for a time. This could cause a lot of passenger discomfort. With HL chosen to prevent this, it would take longer to get back on course but there would be less screaming in the cabin. In other autopilot modes such as landing with the rate inner loop being used, the lower limit LL would prevent an overly large nose down signal when the aircraft was far off course above the desired flight path.

Figure 1:
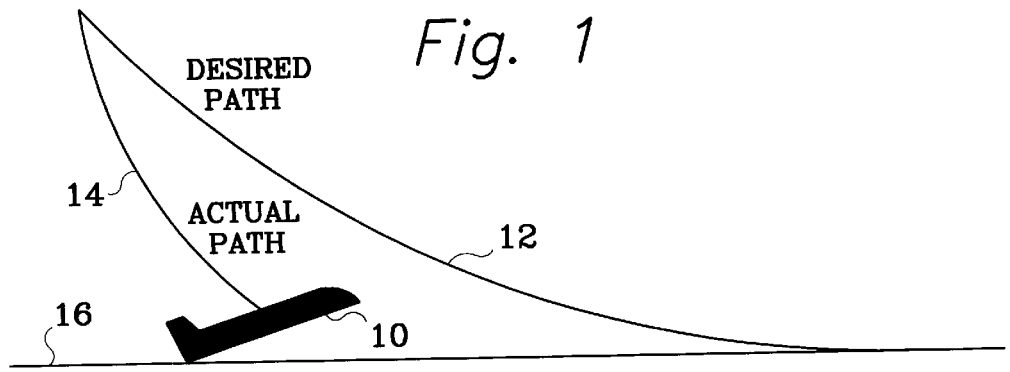
FIG. 1 is a drawing showing the desired and actual flight paths of an aircraft.
Figure 2:
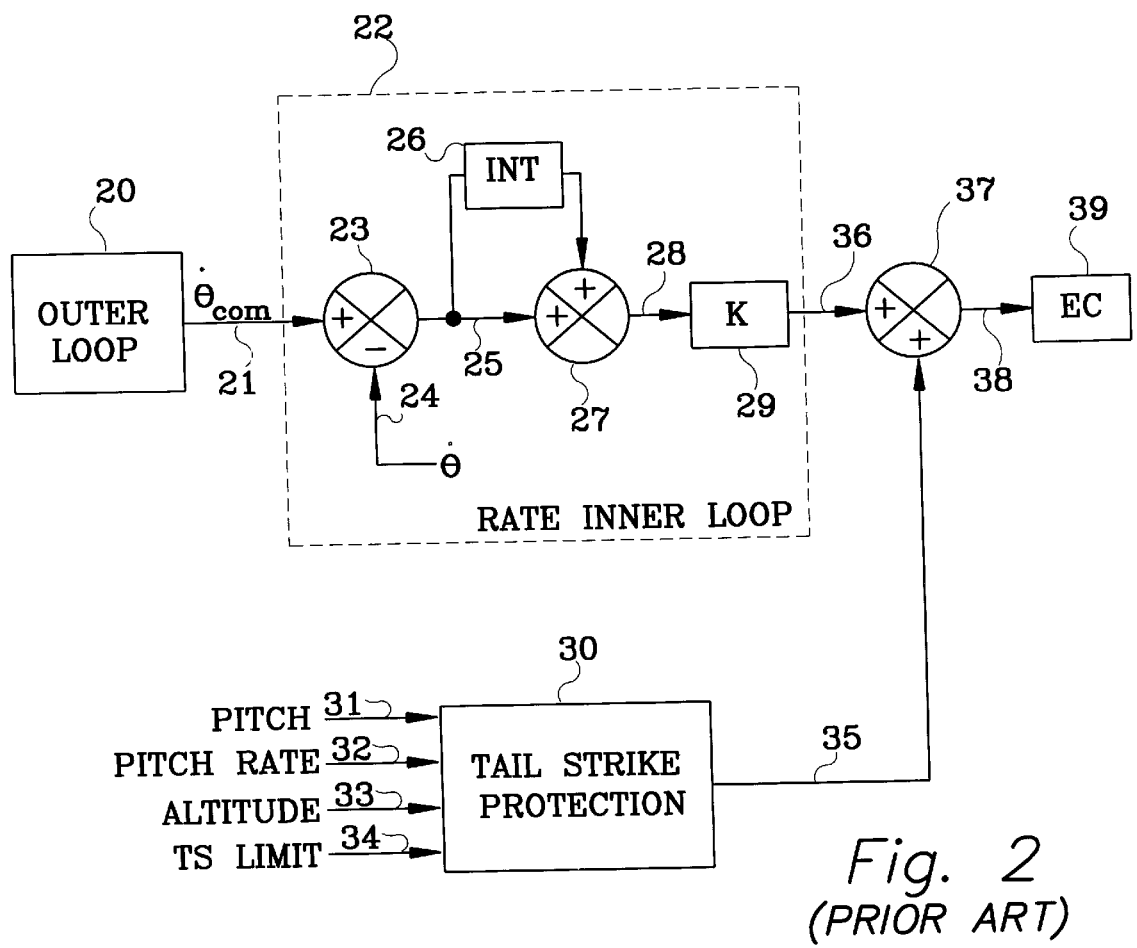
FIG. 2 is a block diagram of a tail strike protection system of the type used on a rate responsive system.

The output of the tail strike protection box which is a rate command signal for greater system responsiveness, is connected by line 114 to the inner loop box 116 which may be the same as in FIG. 2, and which produces the elevator output command signal on line 118 to the elevator controls shown as box 119.

The circuit of FIG. 4 is normally used in general landing situations where the inner loop is a pitch rate circuit. In other cases, as for example a "go around" situation, the inner loop is switched to be an attitude rate circuit. When the inner loop is pitch attitude circuit, the same tail strike protection circuit is used but the block diagram will be like that shown in FIG. 5.

Figure 3:
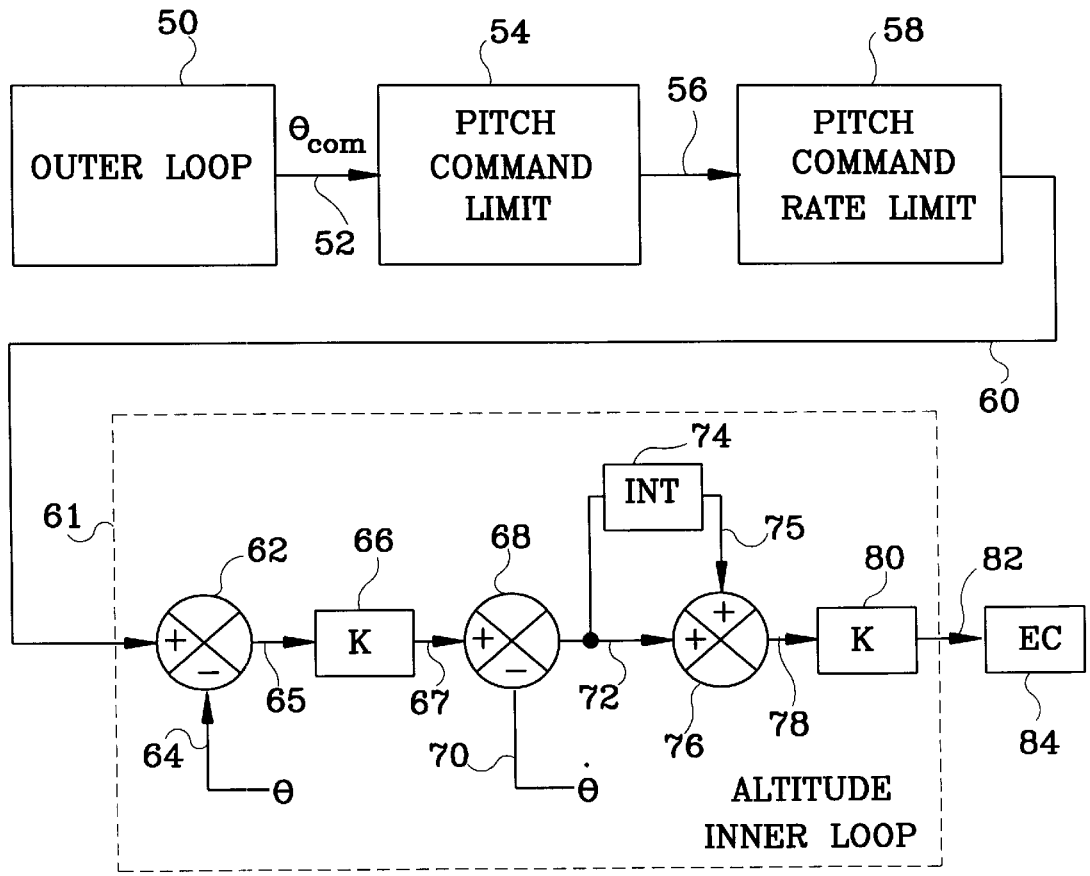
FIG. 3 is a block diagram of a tail strike protection system of the type used on a attitude responsive system.
Figure 5:
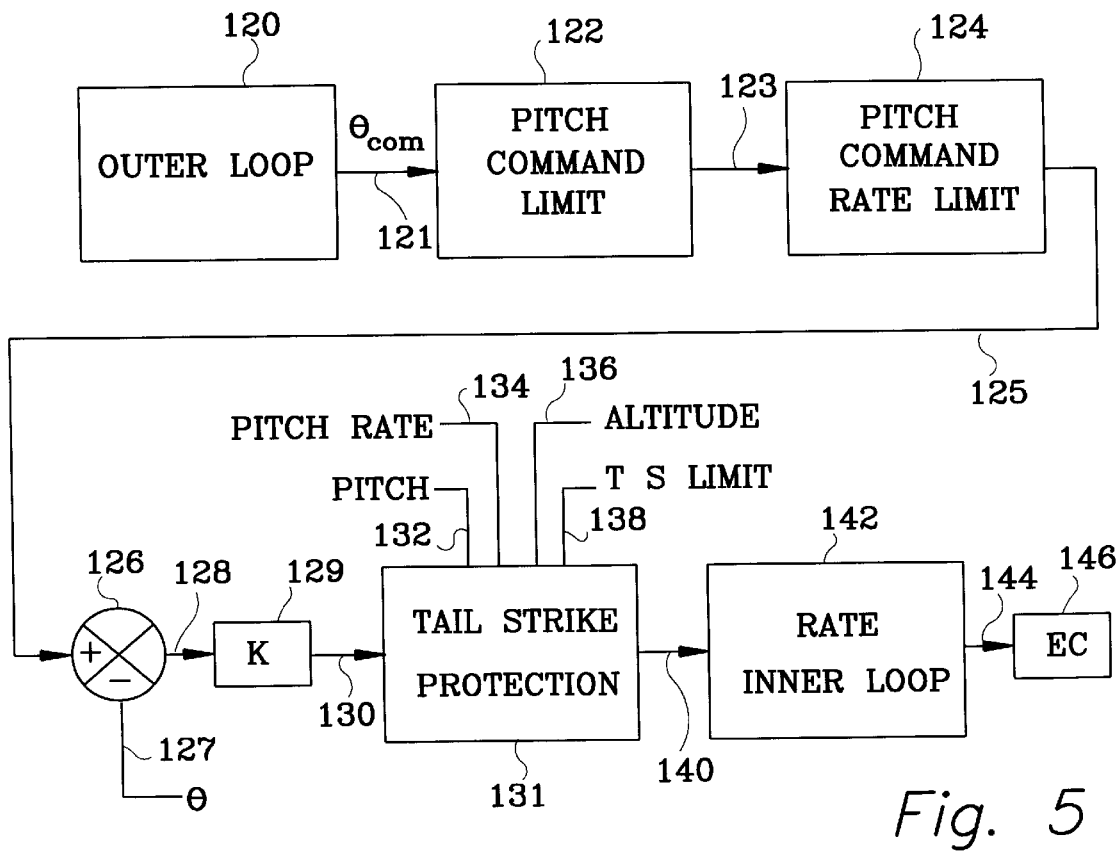
FIG. 5 is a block diagram of the present invention used with an attitude responsive system; and, FIG. 6 is a block diagram of an alternate tail strike protection circuit.

In FIG. 5, the outer loop box 120 is shown producing a pitch attitude command signal, $\theta_{com}$, which is presented on a line 121 to a pitch command limit box 122. This pitch command limit box 122 performs differently than the pitch command limit box 54 of FIG. 3. Instead of limiting the pitch command so as not to exceed the tail strike pitch attitude the limit is set to the maximum allowable pitch attitude for the autopilot mode that it is performing. For example, in case of a "go around" mode, the maximum pitch attitude command for the mode could be as high as 25 degrees, whereas the tail strike limit might be about 10 degrees. Hence initially, more pitch angle error will be detected and more nose up elevator will be issued to start the rotation of the aircraft, making the aircraft more responsive than the system described in FIG. 3. The limited pitch command signal from pitch command limit box 122 is presented by a line 123 to a pitch command rate limit box 124. Pitch command rate limit box 124 performs the same function as it did in FIG. 3, to reduce any sudden pitch commands so that they occur more slowly. The controlled and limited pitch command signal from pitch command rate limit box 124 is presented by a line 125 to a summing circuit 126 which compares the limited pitch command signal with the actual pitch attitude, $\theta$, on a line 127 and any difference is a pitch angle error signal presented on a line 128 to a gain box 129 which operates to modify the pitch angle error signal so as to produce a pitch rate command signal on a line 130 for presentation to a tail strike protection box 131. Tail strike protection box 131 may be the same as the tail strike protection box 104 of FIG. 4 having the same pitch, pitch rate, altitude and tail strike limit inputs 132, 134, 136 and 138 respectively and utilizing the same equation 1, i.e. $UL=[K_1\theta_{ref}-\theta-K_2\dot{\theta})]_{LL}^{HL}$, so as to enable the tail strike protection box 131 to produce a signal on a line 140 which is pitch attitude limited for assurance against tail strike but which is a rate signal for greater system responsiveness. This signal is presented to a rate inner loop box 142 which may be the same as the rate inner loop box 22 of FIG. 2 and which produces a final elevator control signal on a line 144 to the elevator controls shown as box 146.

It is seen that placing the tail strike protection circuit of the present invention so that it provides the rate command input to the rate inner loop circuit of the aircraft provides a most reliable and responsive tail strike prevention systems. The tail strike protection function of box 131 may be a microprocessor programmed in a straightforward manner to solve Equation 1. An alternate circuit for the tail strike function may be seen in FIG. 6.

Figure 6:
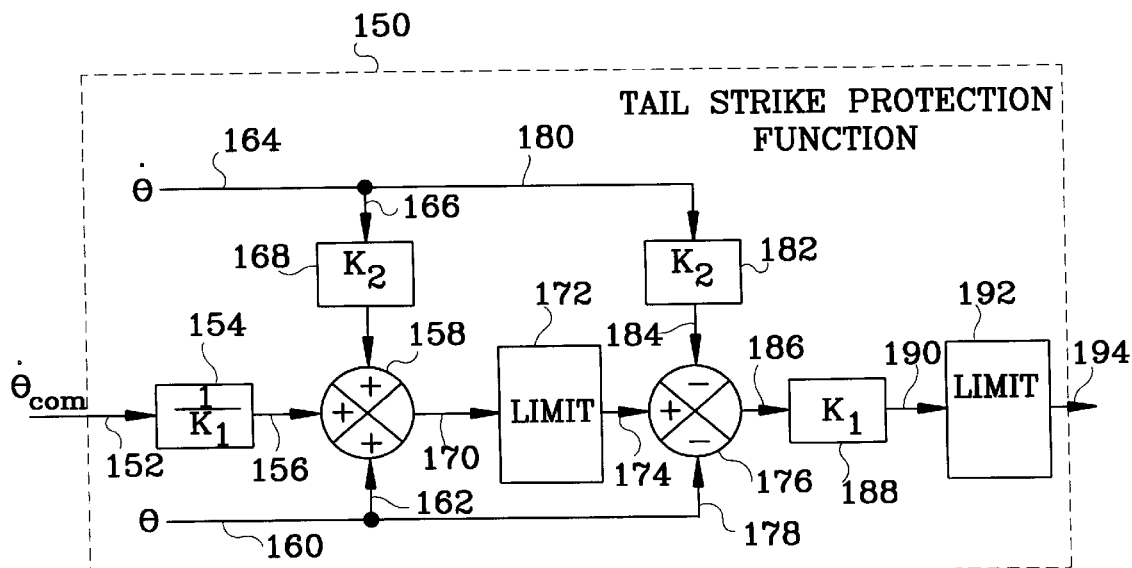

In FIG. 6, a signal indicative of a pitch rate command, $\dot{\theta}_{com}$, is presented to the tail strike protection circuit shown in dashed lines 150 on a line 152 to a gain circuit 154. Circuit 154 produces an output on a line 156 indicative of the multiplication of $\dot{\theta}_{com}$ by the reciprocal of $K_1$ and presents it to a first summing circuit 158. The value of $K_1$ is the same as in Equation 1 above. A signal indicative of pitch, $\theta$, is presented to summing circuit 158 on lines 160 and 162 while a signal indicative of pitch rate, $\dot{\theta}$, is presented to summing circuit 158 from lines 164 and 166 through a gain box 168 which operates to multiply $\dot{\theta}$ by $K_2$, where $K_2$ is the same value as in equation 1 above. Summing circuit 158 produces an output on a line 170 indicative of ($\dot{\theta}_{com}/K_1+K_2\dot{\theta}+\theta$) which is presented to a limit circuit 172 which operates to limit the signal so that it will not exceed the tail strike value, $\theta_{ref}$. Thus, in the case when the signal into limit box 172 is greater than $\theta_{ref}$, the output of limit box 172 will be $\theta_{ref}$. This limited $\theta_{ref}$ signal from the limit circuit 172 is presented by a line 174 to a second summing circuit 176. The signal indicative of pitch angle, $\theta$, is also presented to summing circuit 176 over a line 178. The signal indicative of pitch rate, $\dot{\theta}$, is presented over a line 180 to a gain circuit 182 which again multiplies the signal by $K_2$ which is presented to summing circuit 176 over a line 184. Summing circuit 176 operates to subtract the signals on lines 178 and 184 from the signal on line 174 so as to produce an output indicative of $[\theta_{ref}-\theta-K_2\dot{\theta}]$ on line 186 which is presented to a gain box 188. Gain box 188 operates to multiply the signal on line 186 by $K_1$ so as to produce a resultant signal indicative of:

$$K_{1[\theta_{ref}-\theta-K_2\dot{\theta}]}.$$

This signal is presented on a line 190 to a limit box 192 which like equation 1 limits the output so that it will not exceed an upper limit HL nor fall below a lower limit LL. The resultant output signal is seen to be the same as Equation 1 and is presented on an output line 194. Thus the apparatus of FIG. 6 will operate to produce the same result as the previously described tail strike protection circuits.

In the case when the signal on line 170 indicative of ($\dot{\theta}_{com}/K_1+K_2\dot{\theta}+\theta$) is less than the tail strike value, $\theta_{ref}$, presented in the limit circuit 172, meaning no tail strike protection is required, the output of the limit circuit 172 as presented on line 174 would have the same value as on line 170. The value of the signal on line 174 is then presented to the summing circuit 176. The signal indicative of pitch angle, $\theta$, is also presented to the summing circuit 176 over a line 178. The signal indicative of pitch rate, $\dot{\theta}$, is presented over a line 180 to a gain circuit 182 which again multiplies the signal by $K_2$ which is presented to summing circuit 176 over a line 184. Summing circuit 176 operates to subtract the signals on line 178 and 184 from the signal on line 174 so as to produce an output indicative of $\dot{\theta}_{com}/K_1$ on line 186 which is presented to a gain box 188. Gain box 188 operates to multiply the signal on line 186 by $K_1$ so as to produce a resultant signal indicative of $\dot{\theta}_{com}$, which is the same input signal as presented in line 152. Finally this signal is presented to the limit circuit 192 by line 190 which limits the output so that it will not exceed an upper limit HL nor fall below a lower limit LL. This demonstrates the tail strike protection function does not alter the outer loop command signal if tail strike protection is not required unless the outer loop command exceeds the value of HL or fall below the value of LL because the outer loop command could cause passenger discomfort if not reduced by the limit circuit 192.

It is thus seen that I have provided a circuit for preventing ground strike in an aircraft which is both highly reliable and rapid in response. The disclosure has been specific to preventing tail strike but, of course, if it is desired to protect the aircraft against wing tip strike or nose wheel strike, the same principles would be involved although different values would be used. For example, instead of pitch and pitch rate signals, roll and roll rate signals would be used for wing tip strike protection and for nose strike protection, the strike value dependent on aircraft geometry would be different and nose up rather than nose down signals would be employed. In detail, for wing tip strike protection, Equation 1 would be replaced with:

$$RRL=[C_1(\phi\text{wing ref}-\phi-C_{2\dot{\phi}})]_{-MRR}^{+MRR} \qquad \text{(Equation 2)}$$

where RRL is the roll rate limit; $C_1$ and $C_2$ are designer's choice with similar design approaches as $K_1$ and $K_2$ in Equation 1; $\phi_{wing\ ref}$ is the wing tip strike limit which is a function of aircraft geometry and altitude; $\phi$ is the roll attitude signal; φ is the roll rate signal; +MRR is the maximum roll rate that the designer wants to limit the aircraft to roll in the right wing down direction; and −MRR is the maximum roll rate that the designer wants to limit the aircraft to roll in the left wing down direction.

For nose wheel strike protection, Equation 1 would be replaced with:

$$BL=[K_1(\theta_{nose\ ref}-\theta-K_2\dot{\theta})]_{LL}^{HL} \qquad \text{(Equation 3)}$$

where BL is the pitch rate limit for nose down, $\theta_{nose\ ref}$ is the nose wheel strike limit and, $\theta$, $\dot{\theta}$, $K_1$, $K_2$, HL and LL are the same as in Equation 1. It will be noted that instead of forming an upper limit UL as in Equation 1, Equation 3 is forming a lower limit BL such that the pitch rate command that goes to the rate inner loop cannot be below BL.

Many changes will occur to those skilled in the art and I do not wish to be limited to the specific disclosures used in connection with the description of the preferred embodiments. I intend only to be limited by the following claims.

I claim:

1. Ground strike prevention apparatus for use with an aircraft having a control surface, an autopilot operable to produce command signals through an outer loop and an inner loop operable to receive command signals and produce control signals for positioning the control surface, the apparatus comprising:

ground strike protection apparatus connected to receive unmodified command signals generated in response to an output of the outer loop, the ground strike protection apparatus being operable to modify the unmodified command signals to produce ground strike protection signals when the unmodified command signals could cause a ground strike; and means connecting the ground strike protection apparatus to the inner loop to thereby provide the ground strike protection signals to the inner loop so that control signals normally generated by the inner loop are modified by the ground strike protection signals in a manner to prevent ground strike.

2. Apparatus according to claim 1 wherein the ground strike protection apparatus modifies the unmodified command signals to have a limit, L, according to the equation:

$$L=[K_1(\theta_{ref}-\theta-K_2\dot{\theta})]$$

Where K1 is a constant to convert angular changes to angular rate, K2 is a constant to convert angular rate to angular changes, $\theta_{ref}$ is the aircraft ground strike limit, $\theta$ is the aircraft actual angle and $\dot{\theta}$ is the aircraft actual angular rate.

3. Apparatus according to claim 2 wherein the inner loop is a rate inner loop.

4. Apparatus according to claim 2 wherein the inner loop is an attitude inner loop.

5. Apparatus according to claim 2 wherein the L is further constrained not to exceed a first upper value HL.

6. Apparatus according to claim 2 wherein the L is further constrained to be between an upper value HL and a lower value LL.

7. Tail strike prevention apparatus for use with an aircraft having an elevator control surface, an autopilot operable to produce pitch command signals through an outer loop and an inner loop operable to receive command signals and produce control signals for positioning the elevator control surface, the apparatus comprising:

tail strike protection apparatus connected to receive unmodified pitch command signals generated in response to an output of the outer loop, the tail strike protection apparatus being operable to modify the unmodified pitch command signals into modified pitch command signals when the unmodified pitch command signals could cause a tail strike; and means connecting the tail strike protection apparatus between the outer loop and the inner loop to provide the modified pitch command signals to the inner loop to change the control signals normally generated therefrom to prevent ground strike.

8. Apparatus according to claim 7 wherein the tail strike protection apparatus modifies the unmodified command signals to have an upper limit, UL, according to the equation:

$$UL=[K_1(\theta_{ref}-\theta-K_2\dot{\theta})]$$

Where $K_1$ is a constant to convert pitch angle changes to angular rate, $K_2$ is a constant to convert angular rate to angle changes, $\theta_{ref}$ is the aircraft pitch strike limit, $\theta$ is the aircraft actual pitch angle and $\dot{\theta}$ is the aircraft actual pitch angular rate.

9. Apparatus according to claim 8 wherein the equation is $$UL=[K_1(\theta_{ref}-\theta-K_2\dot{\theta})]_{LL}^{HL}$$

where HL is an upper limit above which UL is not permitted and LL is a lower limit below which UL is not permitted.

10. The method of preventing ground strike in an aircraft having a control surface, an autopilot operable to produce command signals through an outer loop and an inner loop operable to receive command signals and produce control signals for positioning the control surface, comprising the steps of:

A. determining from the aircraft altitude and the aircraft geometry, a ground strike limit, $\theta_{ref}$, above which the aircraft will strike the ground;

B. modifying command signals generated in response to an output of the outer loop according to the equation:

$$UL=[K_1(\theta_{ref}-\theta-K_2\dot{\theta})]$$

where UL is the upper limit permitted for a signal to the inner loop, $K_1$ is a constant to convert angle changes to angular rate, $K_2$ is a constant to convert angular rate to angle changes, $\theta_{ref}$ is the aircraft ground strike limit, $\theta$ is the aircraft actual angle, and $\dot{\theta}$ is the aircraft actual angular rate, said modifying step producing modified command signals; and C. processing the modified command signals with the inner loop to thereby produce control signals for positioning the control surface.

11. Apparatus according to claim 1 wherein the ground strike protection apparatus modifies the unmodified command signals to have an upper limit, UL, according to the equation $$UL=[K_1(\theta_{tail\ ref}-\theta-K_2\dot{\theta})]$$

where $K_1$ is a constant to convert angular changes to angular rate, $K_2$ is a constant to convert angular rate to angular changes, $\theta_{tail\ ref}$ is the tail strike limit, $\theta$ is the aircraft actual pitch attitude, and $\dot{\theta}$ is the aircraft actual pitch rate.

12. Apparatus according to claim 1 wherein the ground strike protection apparatus modifies the unmodified command signals to have a roll rate limit, RRL, according to the equation:

$$RRL = [C_1(\phi_{wing\ ref} - \phi - C_2\dot{\phi})]$$

where $C_1$ is a constant to convert angular changes to angular rate, $C_2$ is a constant to convert angular rate to angular changes; $\phi_{wing\ ref}$ is the wing tip strike limit; $\phi$ is the aircraft actual roll attitude; and $\dot{\phi}$ is the aircraft actual roll rate.

13. Apparatus according to claim 1 wherein the ground strike protection apparatus modifies the unmodified command signals to have a nose down pitch rate limit, BL, according to the equation:

$$BL = [K_1(\theta_{nose\ ref} - \theta - K_2\dot{\theta})]$$

where $\theta_{nose\ ref}$ is the nose wheel strike limit, $\theta$ is the aircraft actual pitch attitude, $K_1$ is a constant to convert angular changes to angular rate, $K_2$ is a constant to convert angular rate to angular changes and $\dot{\theta}$ is the aircraft actual pitch rate.

* * * * *